United States Patent Office 3,557,224
Patented Jan. 19, 1971

3,557,224
PROCESS FOR THE MANUFACTURE OF PERFLUOROALKYLIODIDES
Horst Jaeger, Bettingen, Switzerland, assignor to Ciba Limited, Basel, Switzerland, a Swiss Company
No Drawing. Filed Sept. 25, 1968, Ser. No. 762,649
Claims priority, application Switzerland, Oct. 4, 1967, 13,835/67
Int. Cl. C07c *17/28*
U.S. Cl. 260—653.1       8 Claims

ABSTRACT OF THE DISCLOSURE

A process is provided for the manufacture of perfluoroalkyliodide telomers from the corresponding monomers, in which a perfluoroalkyliodide is telomerized with a perfluoroethylene or a perfluoropropylene containing at most one chlorine atom in the present of a catalyst pair consisting of a metal salt of Group 1b or 2b of the Periodic Table and an amine at 50 to 350° C. and under a pressure from 0 to 200 atmospheres (gauge).

The so-obtained products are useful as intermediates for the manufacture of reactive compounds. The latter may be used for making oleophobizing textile auxiliaries or surface active compounds.

The present invention provides a process for the manufacture of perfluoroalkyliodide telomers from the corresponding monomers, characterized in that (a) a perfluoroalkyliodide is telomerized with
(b) a perfluoroethylene or perfluoropropylene containing at most one chlorine atom, in the presence of
(c) a metal salt of a metal of Group 1b or 2b of the Periodic Table and of
(d) an amine as a catalyst pair, at a temperature from 50 to 350° C. under a pressure from 0 to 200 atmospheres (gauge).

The perfluoro compounds of components (a) and (b) are compounds fluorinated as completely as possible, preferably compounds containing beside the iodide atoms in component (a) only fluorine atoms as substituents. But compounds which are not completely fluorinated also belong to these perfluoro compounds, such as compounds additionally containing at most 2 hydrogen atoms and/or at most one chlorine atom.

The perfluoroalkyliodides to be used in this invention may be mono-iodides or di-iodides. These perfluoroalkyliodides of the component (a), also called telogens, are preferably branched or linear perfluoroalkyliodides containing 1 to 10 carbon atoms, or cyclic perfluoroalkyliodides containing 4 to 6 cyclic carbon atoms. Suitable telogens are for example, trifluoromethyliodide, pentafluoroethyliodide, heptafluoro-propyl-1- or -2-iodide, undecafluoro - cyclohexyliodide, decafluoro - cyclohexyl-1,3-diiodide or tetrafluoroethyl-1,2-diiodide. Preferred use is made of branched or linear perfluoroalkyl mono-iodides or di-iodides containing 1–3 carbon atoms.

The component (b) used in the process of this invention, also called a taxogen, is preferably tetrafluoroethylene or hexafluoropropylene; olefins such as trifluoroethylene, trifluorochloroethylene or pentafluorochloropropylene are likewise suitable for telomerization.

The telomerization according to this process is performed in the presence of a catalyst pair consisting of a metal salt and an amine. As metal salts (c) of metals of Group 1b or 2b of the Periodic Table there are specially suitable metal halides such as the chlorides, bromides or iodides of copper-(I), silver, gold, zinc, cadmium or mercury. Likewise suitable are the corresponding cyanides, sulphates or nitrates of these metals. Mercury may be present in the monovalent and/or divalent oxidation stage. Particularly suitable are the halides, cyanides or sulphates of copper-(I), silver, gold or cadmium, and copper-(I)-chloride is preferred. The amines of the component (c) are especially primary, secondary or tertiary alkyl-, cycloalkyl-, aryl- or alkanol-amines; for example, there may be mentioned ethanolamine, diethanolamine or triethanolamine.

The proportions of components (a) to (d) vary within rather wide limits, depending on what degree of telomerization is desired. The molecular ratios are preferably:

(a):(b)=1:1 to 1:10
(a):(c)=1:0.003 to 1:0.03
(a):(d)=1:0.05 to 1:1

The telomerization according to this invention is performed at a temperature from 50 to 350° C., especially from 60 to 300° C. and preferably from 100 to 250° C.

Depending on whether the boiling points of components (a) and (b) are below or above 60° C., the telomerization is advantageously carried out in an autoclave or in an open vessel. The pressure set up within the autoclave during the reaction depends on the initially used quantity of the telogen (a) and the taxogen (b) and is between 0 and 200, preferably from 10 to 100 atmospheres (gauge), depending on the reactants used.

The telomerization proceeds smoothly and gives good yields. In each case the resulting product is a mixture of perfluoroalkyliodides of different degrees of telomerization which are easy to determine by mass spectrography. As a rule the main constitutents of the reaction products are perfluoroalkyliodides containing 4 to 5 moles of component (b) per iodine residue per mol of component (a) fused on by telomerization. There are also obtained small quantities of products in which 3 or even only 2 mols of component (b) are fused on to each iodine residue, and in a very small proportion also so-called 1:1-adducts are formed.

Apart from the fact that telomerization with the catalyst system to be used according to this invention proceeds so smoothly and with good effects, the catalyst pair metal salt+amine has over the previously used catalyst systems, such as $IF_5\text{-}SbF_3$, $IF_5\text{-}AlCl_3$ or $HF\text{-}SF_4$, the further advantage that it is not corrosive and the requisite apparatus, and with them the necessary precautions, are substantially simpler.

EXAMPLE 1

A mixture of 38 g. (0.154 mol) of pentafluoroethyliodide, 50 mg. of CuCl ($5.05 \times 10^{-4}$ mol) and 5 ml. ($8.34 \times 10^{-2}$ mol) of ethanolamine is introduced into a steel autoclave of 300 ml. capacity. The mixture is cooled to −70° C., the autoclave scavenged with nitrogen and then evacuated. Then 32 g. (0.32 mol) of tetrafluoroethylene are injected, and the autoclave is heated with stirring to room temperature and then to 110° C., so that the pressure rises to 22 atmospheres. At 110° C. a rapid rise to 200° C. sets in without the pressure rising further. Without heating, merely by the released heat of reaction, the temperature remains at 200° C. for 45 minutes. The batch is then stirred on for 2 hours at 130° C., cooled to room temperature and degassed. The reaction product is poured over ice water and the separating reaction product is separated as the bottom phase, whereby 37.5 g. of a brown, semisolid product can be isolated. Referred to the perfluorobutyliodide obtained as hypothetic reaction product, the yield amounts to 53.57% of perfluoroalkyliodide. By mass spectrometry and gas chromatography the following composition of the reaction product is revealed:

|  | Grams | Percent |
|---|---|---|
| $CF_3(CF_2)_{11}I$ | 19 | 50.7 |
| $CF_3(CF_2)_9I$ | 2.2 | 5.9 |
| In a decreasing amount: | | |
| $CF_3(CF_2)_7I$ | } | |
| $CF_3(CF_2)_5I$ | } 16.3 | 43.4 |
| $CF_3(CF_2)_3I$ | } | |
| Total | 37.5 | 100 |

In the cooling trap, in which the waste gases from the autoclave are collected, another 1.2 g. of perfluoroethyliodide can be isolated.

EXAMPLE 2

A 300-ml.-autoclave equipped with magnetic stirrer is charged with 100 mg. of CuCl and 3 g. of ethanolamine as catalyst and with 98 g. of n-perfluorooctane as solvent. The autoclave is cooled to −70° C., scavenged with nitrogen and evacuated. Then 19.6 g. (0.1 mol) of trifluoromethyliodide and 28 g. (0.28 mol) of tetrafluoroethylene are injected. The autoclave is heated to room temperature while stirring, then heated to 70° C. Within 5 minutes the temperature rises from +70° C. to +280° C. (pressure: 37.5 atmospheres), then to 320° C. (pressure: 36 atmospheres) and after 1 hour it drops again to 155° C. (pressure: 15 atmospheres). The batch is allowed to react further for 12 hours at 160° C., then cooled to room temperature and degassed via 3 cooling traps. 12 grams of $CF_3I$ are recovered. From the autoclave 8.8 g. of a waxy product are isolated which, after sublimation, melts at 178–182° C. By mass spectroscopy and gas chromatography the following telomers are identified:

$$CF_3(CF_2CF_2)_nI$$

| n | Molecular Weight | Content in percent |
|---|---|---|
| 9 | 1,096 | 1.75 |
| 8 | 996 | 5.50 |
| 7 | 896 | 26.43 |
| 6 | 796 | 11.75 |
| 5 | 696 | 30.00 |
| 4 | 596 | 24.58 |

Calculated from a mean molecular weight of 796, the yield amounts to 28.4% of theory.

EXAMPLE 3

A mixture of 63 g. of $CF_3CF_2I$ (0.322 mol)
48 g. of $CF_2=CF_2$ (0.48 mol)
100 g. of CuCl and
5 g. of ethanolamine is reacted as described in Examples 1 and 2.

The reaction sets in at 120° C. under 32 atmospheres pressure; it is slow and takes 15 hours. The temperature is raised to 165° C. (pressure: 38 atmospheres). Within 24 hours the pressure drops to 17 atmospheres (165° C.). The batch is allowed to react for another 6 hours, during which the pressure no longer changes. On degassing, 15 g. of pentafluoroethyliodide are recovered.

By distillation 7.7 g. of product are isolated in which the following are identified by mass spectroscopy:

| n | Molecular Weight | Content in percent |
|---|---|---|
| 4 | 646 | 6.97 |
| 3 | 546 | 88.32 |
| 2 | 446 | 4.65 |

By sublimation 11.7 g. of cream-coloured telomer of the formula 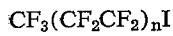 $CF_3CF_2(CF_2CF_2)_nI$ are obtained. Mass spectroscopy and gas chromatography reveal the following values:

| n | Molecular Weight | Content in percent |
|---|---|---|
| 7 | 946 | 3.85 |
| 6 | 846 | 26.92 |
| 5 | 746 | 69.23 |

Melting point: 152 to 161° C.

Referring to a main molecular weight of 746 (about 0.1 mol of $CF_3CF_2I$ reacted with 0.5 mol of $CF_2CF_2$) the yield amounts to 26.0% of theory.

EXAMPLE 4

A mixture of 48 g. of pentafluoroethyliodide (0.245 mol)
43 g. of tetrafluoroethylene (0.43 mol)
0.1 g. of AuCN and
5 g. of ethanolamine is reacted as described in Examples 1 and 2.

The reaction sets in at 165° C. under a pressure of 39 atmospheres. The reaction temperature is maintained for 48 hours at 165° C., during which the pressure drops to 21 atmospheres. The batch is then heated for 2 hours at 300° C.; the pressure rises for a short time to 47 atmospheres and drops to 0 atmosphere during the cooling to room temperature. Yield: 90 g. of a granular, dark-brown material from which 4 g. of a cream-coloured sublimate can be isolated which sinters at 87° C. and melts at 190° C. By mass spectroscopy and gas chromatography the following telomers are identified:

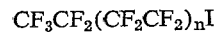 $CF_3CF_2(CF_2CF_2)_nI$

| n | Molecular Weight | Content in percent |
|---|---|---|
| 7 | 946 | 1.02 |
| 6 | 846 | 13.26 |
| 5 | 746 | 72.44 |
| 4 | 646 | 13.26 |

The residue contains 68.4% of fluorine and 4.9% of iodine, from which an empirical formula of $C_{46}F_{93}I$ or $CF_3CF_2(CF_2CF_2)_{22}I$ results. The yield amounts to approximately 100% of the theoretical.

EXAMPLE 5

A mixture of 52 g. of pentafluoroethyliodide (0.265 mol)
62 g. of tetrafluoroethylene (0.62 mol)
100 mg. of $CdSO_4$ and
5 g. of ethanolamine is reacted as described in Examples 1 and 2.

The reaction sets in at 160° C. under a pressure of 50 atmospheres. The autoclave is kept for 46 hours at this temperature, during which the pressure drops to 17 atmospheres. 12 grams of pentafluoroethyliodide are recovered by degassing. Fom the autoclave 89 g. of a brown, waxy product are isolated. Its sublimate (21.4 g.) melts at 130 to 133° C. Mass spectroscopy and gas chromatography reveal $CF_3CF_2(CF_2CF_2)_nI$.

| n | Molecular Weight | Content in percent |
|---|---|---|
| 8 | 1,046 | 5.43 |
| 7 | 946 | 19.56 |
| 6 | 846 | 53.26 |
| 5 | 746 | 21.74 |

The yield amounts to 21% of theory.

The remaining 67.6 g., a brown, granular product, are not worked up (cf. Example 4). The total yield is 87.5% of theory.

EXAMPLE 6

A mixture of 50 g. of n-perfluoropropyliodide (0.17 mol)
61 g. of tetrafluoroethylene (0.61 mol)
100 mg. of AgI and
5 g. of diethanolamine is reacted as described in Examples 1 and 2.

The reaction sets in at 150° C. under a pressure of 46 atmospheres. The temperature rises to 185° C. within 2 minutes at a pressure of 49 atmospheres and drops again to 160° C. within 20 minutes at 46 atmospheres; the autoclave is then heated to 96 hours at 160° C., during which the pressure drops to 14 atmospheres. This pressure of 14 atmospheres is already set up after 36 hours. 10 grams of n-perfluoropropyliodide are recovered on degassing. 81.6 grams of a brown, waxy substance are isolated from the autoclave. 40.1 grams of a beige-coloured sublimate melt at 150° C. By mass spectroscopy and gas chromatography $CF_3CF_2CF_2(CF_2CF_2)_nI$ are identified:

| n | Molecular Weight | Content in percent |
|---|---|---|
| 12 | 1,496 | 5.55 |
| 11 | 1,396 | 30.55 |
| 10 | 1,296 | 63.88 |

The yield of sublimed perfluoroalkyliodide is 39.8% of the theoretical. 41.5 grams of perfluoroalkyliodide have a higher molecular weight and can no longer be sublimed.

The total yield amounts to 80.8% of theory.

EXAMPLE 7

A mixture of 29.6 g. of n-perfluoropropyliodide (0.1 mol)
55 g. of tetrafluoroethylene (0.55 mol)
100 mg. of CdSO₄ and
5 g. of triethanolamine are reacted as described in Examples 1 and 2.

The reaction sets in at 128° C. under a pressure of 38 atmospheres. The autoclave is heated for 120 hours at 100° C., during which the pressure drops to 7.5 atmospheres. After 70 hours the reaction is substantially complete. 20 grams of n-perfluoropropyliodide are recovered by degassing. After flushing with water, 14.7 g. of a waxy, brown product are isolated from the autoclave which on sublimation yields 10 g. of a cream-coloured telomer melting at 120 to 130° C.

Mass spectroscopy and gas chromatography reveal: $CF_3CF_2CF_2(CF_2CF_2)_nI$

| n | Molecular Weight | Content in percent |
|---|---|---|
| 7 | 996 | 6.7 |
| 6 | 846 | 55.3 |
| 5 | 746 | 38.0 |

Referred to a mean molecular weight of 846 the yield of sublimate amounts to 33.1% of theory.

EXAMPLE 8

A mixture of 29.6 g. of perfluoroisopropyliodide (0.1 mol)
10 g. of tetrafluoroethylene (0.1 mol)
100 mg. of CuCl and
3 g. of ethanolamine is reacted as described in Exampes 1 and 2.

The reaction sets in slowly at 190° C. under a pressure of 15 atmospheres. The autoclave is heated for 25 hours at 190° C., during which the pressure drops to 9 atmospheres. The batch is degassed at room temperature and 4 g. of perfluoroisopropyliodide are recovered.

The residue (16.2 g.) is sublimed, to furnish 4.4 g. of sublimate.

Mass spectroscopy and gas chromatography reveal

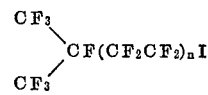

| n | Molecular Weight | Content in percent |
|---|---|---|
| 8 | 1,096 | 0.46 |
| 7 | 996 | 4.56 |
| 6 | 896 | 25.11 |
| 5 | 796 | 35.62 |
| 4 | 696 | 10.95 |
| 3 | 596 | 23.29 |

Referred to a molecular weight of 796 (0.02 mol of iodide+0.1 mol of tetrafluoroethylene) the yield amounts to 27.6% of theory.

EXAMPLE 9

A mixture of 50 g. of perfluoroisopropyliodide (0.168 mol)
60 g. of tetrafluoroethylene (0.6 mol)
100 mg. of CuCl and
5 g. of ethanolamine is reacted as described in Examples 1 and 2.

The reaction sets in at 140° C. under a pressure of 32 atmospheres. After 36 hours at 140° C. the reaction is complete (22 atmospheres). 37 grams of perfluoroisopropyliodide are degassed. The residue consists of 33.6 g. of a waxy substance from which by sublimation 20.6 g. of a cream-coloured telomer melting at 120 to 140° C. are obtained.

By mass spectroscopy the following telomers are identified:

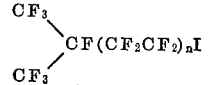

| n | Molecular Weight | Content in percent |
|---|---|---|
| 6 | 896 | 20 |
| 5 | 796 | 40 |
| 4 | 696 | 40 |

Referred to reacted perfluoroisopropyliodide and a mean molecular weight of 796 the yield amounts to 61.5% of theory.

EXAMPLE 10

A mixture of 29.6 g. of perfluoroisopropyliodide (0.1 mol)
76 g. of perfluoropropene (about 0.5 mol)
100 mg. of CuCl and
3 g. of ethanolamine is reacted as described in Examples 1 and 2.

A slow reaction sets in at 160° C. under 35 atmospheres pressure. The autoclave is heated for 72 hours at 160° C., during which the pressure drops to 31 atmospheres. By degassing a mixture of 89 g. of perfluoropropene and perfluoroisopropyliodide is recovered. 10 grams of a waxy, black substance are isolated from the autoclave. 5.1 grams of sublimate sinter at 68° C. and melt at 171° C. Mass spectroscopy reveals: n=2, molecular weight 596, content 98%.

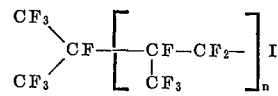

2% are cleavage products or stem from an impurity (tetrafluoroethylene) of perfluoropropene. The yield of sublimate (5.1 g.) referred to the reacted share of 16.6 g. is 30.7%.

EXAMPLE 11

A mixture of 35.4 g. of I—$CF_2CF_2$—I (0.1 mol)
50.0 g. of $CF_2$=$CF_2$ (0.5 mol)
100 mg. of CuCl and
5 g. of ethanolamine is reacted as described in Examples 1 and 2.

The reaction sets in at 150° C. under 35 atmospheres pressure and is maintained for 25 hours at 150 to 160° C., during which the pressure drops to 20 atmospheres. After degassing 16 g. of 1,2-diiodotetrafluoroethane are recovered. Sublimation furnishes 15 g. of telomer melting at 100 to 140° C.

Yield: 20.5%, referred to 0.054 mol of consumed $ICF_2CF_2I$ and an assumed molecular weight of 1354. Mass spectroscopy reveals: $I(CF_2CF_2)_{n+1}I$ [$n+1$ because 1 $CF_2CF_2$ stems from $ICF_2CF_2I$].

| n | Molecular Weight | Content in percent |
|---|---|---|
| 14 | 1,754 | Traces |
| 13 | 1,654 | 0.1 |
| 12 | 1,584 | 4.8 |
| 11 | 1,454 | 15.4 |
| 10 | 1,354 | 31.7 |
| 9 | 1,254 | 31.7 |
| 8 | 1,154 | 16.3 |

What is claimed is:

1. A process for the manufacture of fluoroalkyliodide telomers from the corresponding monomeric perfluoroalkyliodides, which comprises telomerizing
   (a) a perfluoroalkyliodide selected from the group consisting of a branched perfluoroalkyl mono- or di-iodide containing 1 to 10 carbon atoms, a linear perfluoroalkyl mono- or di-iodide containing 1 to 10 carbon atoms and a cycloalkyl perfluoroalkyl mono- or di-iodide containing 4 to 6 carbon atoms, with
   (b) a member selected from the group consisting of tetrafluoroethylene, hexafluoropropylene, trifluoroethylene, trifluorochloroethylene and pentafluorochloropropylene, in the presence of
   (c) a halide, cyanide sulfate or nitrate of a metal of Group 1b or 2b of the Periodic Table and
   (d) an amine selected from the group consisting of a primary, secondary and tertiary alkyl-, cycloalkyl-, aryl- and alkanol-amine, as catalyst pair, at 50 to 350° C. under a pressure from 0 to 200 atmospheres.

2. A process according to claim 1, which comprises using as component (a) a member selected from the group consisting of a branched perfluoroalkyl mono-iodide, a branched perfluoroalkyl di-iodide, a linear perfluoroalkyl mono-iodide and a linear perfluoroalkyl di-iodide, each member containing 1 to 3 carbon atoms.

3. A process according to claim 1, which comprises using as component (b) a member selected from the group consisting of tetrafluoroethylene and hexafluoropropylene.

4. A process according to claim 1, which comprises using as component (c) a member selected from the group consisting of a metal halide, metal cyanide and metal sulfate of a metal of Group 1b or 2b of the Periodic Table.

5. A process according to claim 1, which comprises using as component (c) a member selected from the group consisting of a metal halide, metal cyanide and metal sulfate of a metal selected from the group consisting of copper-(I), silver, gold, zinc, cadmium and mercury.

6. A process according to claim 1, which comprises using as component (c) copper-(I)-chloride.

7. A process according to claim 1, which comprises using as component (d) a member selected from the group consisting of ethanolamine, diethanolamine and triethanolamine.

8. A process according to claim 1, wherein the molecular ratio of (a):(b) equals 1:1 to 1:10, the molecular ratio of (a):(c) equals 1:0.003 to 1:0.03, and the molecular ratio of (a):(d) equals 1:0.05 to 1:1.

References Cited

FOREIGN PATENTS 1,127,045   9/1968   Great Britain _____ 260—653.1

DANIEL D. HORWITZ, Primary Examiner

U.S. Cl. X.R.

252—428, 429